United States Patent [19]

Onoda et al.

[11] Patent Number: 4,771,585
[45] Date of Patent: Sep. 20, 1988

[54] COLLAPSIBLE TRUSS UNIT FOR USE IN COMBINATION WITH OTHER LIKE UNITS FOR THE CONSTRUCTION OF FRAMEWORKS

[75] Inventors: Junjiro Onoda, Machida; Kiyoshi Takamatsu, Utsunomiya, both of Japan

[73] Assignee: Fuji Jukogyo Kabushiki Kaisha, Tokyo, Japan

[21] Appl. No.: 25,362

[22] Filed: Mar. 12, 1987

[30] Foreign Application Priority Data

Jun. 4, 1986 [JP] Japan ................. 61-129509

[51] Int. Cl.$^4$ ............................. E04H 12/18
[52] U.S. Cl. ...................... 52/646; 52/111; 52/632
[58] Field of Search ............. 52/646, 645, 632, 648, 52/111

[56] References Cited

U.S. PATENT DOCUMENTS

| | | | |
|---|---|---|---|
| 3,486,279 | 10/1969 | Webb | 52/646 |
| 4,475,323 | 10/1984 | Schwartzberg | 52/645 |
| 4,578,919 | 4/1986 | Amadon | 52/645 |
| 4,578,920 | 4/1986 | Bush | 403/170 |
| 4,587,777 | 5/1986 | Vasques | 52/645 |
| 4,667,451 | 5/1987 | Onoda | 52/646 |

FOREIGN PATENT DOCUMENTS 164716 2/1987 Japan .

OTHER PUBLICATIONS

Deployable Structures for Large Space Platforms Interim Report, vol. 1, NASA/MSFC Contract, NAS-8-34677, pp. 1-34, 1-36, 1-37 to 1-39 and 1-68, Aug. 1982.
Development of Test Article Building Blocks (TABB) NASA CP-22, pp. 200-208.

Primary Examiner—Henry E. Raduazo
Attorney, Agent, or Firm—Martin A. Farber

[57] ABSTRACT

A collapsible, or deployable, truss unit to be combined with a multiplicity of other similar units for the construction of, typically, medium to large size frameworks for use in outer space. Generally of boxlike shape when deployed, the truss unit comprises two opposite end truss assemblies of rectangular or quadrilateral shape, and an intermediate truss assembly of similar shape interposed therebetween and linked thereto via additional truss members. Two opposite ones of the four truss members of the intermediate truss assembly have each a movable hinge assembly mounted thereto for longitudinal displacement. Each movable hinge assembly has two diagonal truss members pivoted thereto each at one end, the other ends of the diagonal truss members being pivoted to the respective end truss assemblies. The truss unit can be readily deployed or collapsed into flat form by forcibly moving at least one of the hinge assemblies along the associated intermediate truss member as by a wire and pulley arrangement driven by a reversible drive motor.

7 Claims, 11 Drawing Sheets

COLLAPSIBLE TRUSS UNIT FOR USE IN COMBINATION WITH OTHER LIKE UNITS FOR THE CONSTRUCTION OF FRAMEWORKS

BACKGROUND OF THE INVENTION

This invention relates to the novel configuration of a collapsible, or deployable, truss unit for combined use with a plurality or multiplicity of other similar units for the construction of desired frameworks. Typical applications of the truss units of this invention are medium to large scale structures in outer space such as huge antennas, solar power plants, space colonies, space plants and space stations. However, the possible applications of the truss units are not limited to such orbiting structures as the truss units obviously lend themselves to the construction of, for example, temporary or emergency structures on the earth as well.

All the building materials for the construction of orbiting structures in space must of course be transported from the earth as the payload of launch vehicles such as space shuttles. Any spacecraft imposes very stringent limitations on the volume and weight of its payload. Thus the building materials for space use must be as compact in size and light in weight as possible. Many space specialists agree that trusses represent the most promising building materials for the frameworks of medium to large size space constructions. Trusses are very light in weight in comparison with their size but, if not collapsible, are too bulky to be launched into space.

From the foregoing considerations, deployable truss structures are currently believed to be best suited for space constructions. Collapsed into compact form for launching, the deployable truss structures may be unfolded into required shape in space.

A well known example of unidirectionally deployable truss is the "single folding mast" disclosed in "Development of Deployable Structures for Large Space Platform Systems", NASA CR-17093. Such unidirectionally deployable trusses find extensive applications to the keel beams of space stations, the booms of large space antennas, etc. Like many other deployable structures of this class, the "single folding mast" structure is collapsed by bending some of its constituent members at the joints at their midpoints and by telescoping other members.

Such conventional construction is objectionable because its constituent members do not have sufficient mechanical strength at their midportions, which are most closely associated with Euler buckling, resulting in the insufficient rigidity of the complete structure. It might be contemplated to employ very powerful, sturdy mechanisms for locking the joints when the structure is deployed, in order to enhance the rigidity of the deployed structure. However, such locking mechanisms would add considerably to the weight of the structure.

It is desirable that any deployable truss structure be unfolded automatically or at least semiautomatically in outer space. This objective demands utmost reliability in the various working parts and mechanisms of the structure. The joint locks should be not only reliable in operation but also as small in number as possible. The "single folding mast" structure requires, typically, eight locks per unit. This number is not so small as can be desired.

SUMMARY OF THE INVENTION

This invention provides an improved truss unit construction that requires no bending, and no extension or contraction, of the truss members for its folding or unfolding and which has an absolutely minimum number of moving parts, thereby making possible the construction of frameworks of greater rigidity and strength than heretofore.

Briefly, this invention provides a collapsible truss unit for use in combination with other like units for the construction of a desired framework. Generally of boxlike shape when deployed, the truss unit has first and second end truss assemblies at its opposite ends. The first end struss assembly has four end truss members joined end to end in quadrilateral arrangement to provide first, second, third and fourth joints, and a diagonal end truss member extending between two diagonally opposite ones of the first to fourth joints. The second end truss assembly likewise comprises four end truss members joined endwise in quadrilateral arrangement to provide fifth, sixth, seventh and eighth joints which are opposed respectively to the first, second, third and fourth joints of the first end truss assembly, and a diagonal end truss member extending between two diagonally opposite ones of the fifth to eighth joints. Disposed intermediate the first and second end truss assemblies is an intermediate truss assembly comprising four intermediate end truss members joined endwise in quadrilateral arrangement to provide nineth, tenth, eleventh and twelfth joints which are disposed respectively between the first and fifth joints, second and sixth joints, third and seventh joints, and fourth and eighth joints of the first and second end truss assemblies. For operatively interconnecting the first and second end truss assemblies and intermediate truss assembly, first to eighth connective truss members are pivotally joined, each at both ends thereof, to the first and nineth joits, to the second and tenth joints, to the third and eleventh joints, to the fourth and twelfth joints, to the fifth and nineth joints, to the sixth and tenth joints, to the seventh and eleventh joints, and to the eighth and twelfth joints, respectively. The first end truss assembly and the intermediate truss assembly are further interconnected by a first connective diagonal truss member pivotally joined at both ends to the third and tenth joints and by a second connective diagonal truss member pivotally joined at both ends to the fourth and nineth joints. Similarly, the second end truss assembly and the intermediate truss assembly are additionally interconnected by a third connective diagonal truss member pivotally joined at both ends to the seventh and tenth joints and by a fourth connective diagonal member pivotally joined at both ends to the eighth and nineth joints. One of the four intermediate truss members, extending between the nineth and tenth joints, has mounted thereon a first movable hinge assembly which is movable in its longitudinal direction. This first movable hinge assembly is pivotally coupled to one end of each of fifth and sixth connective diagonal truss members, the other ends of which are pivotally joined respectively to the second joint of the first end truss assembly and to the sixth joint of the second end truss assembly. A second movable hinge assembly is displaceably mounted to another of the intermediate truss members which extends between the eleventh and twelfth joints. A seventh connective diagonal truss member is pivotally joined at both ends to the second movable hinge assembly and to the fourth joint of the first end truss assembly, whereas an eighth connective diagonal truss member is pivotally joined at both ends to the second movable hinge assembly and to the eighth joint of the second end truss assembly. Also included is brace means mounted to the intermediate truss assembly for maintaining the same in the required quadrilateral shape when the truss unit is deployed.

When deployed, the truss unit of the above improved configuration typically takes a boxlike shape, with the first and second movable hinge assemblies held against the nineth and eleventh joints, respectively, of the intermediate truss assembly. The truss unit is readily collapsible into a flat, compact form by moving the first movable hinge assembly from the nineth toward the tenth joint of the intermediate truss assemby by, for example, a wire and pulley arrangement driven by a reversible motor, as disclosed herein. During such collapsing, the two end truss assemblies will travel toward the intermediate truss assembly, with the quadrilateral shape of the end truss assemblies held unchanged, whereas the intermediate truss assembly will be folded into a slender shape. The other articulate truss members will also pivotally turn one with respect to another, until at last the complete truss unit becomes flatened. The second movable hinge assembly will first travel from the eleventh toward the twelfth joint and then back toward the eleventh joint. The unfolding of the truss unit is possible by the reversal of the foregoing procedure.

In one preferable modification of the truss unit the brace means takes the form of two elongate, flexible elements such as wires or ropes arranged crosswise with respect to each other and diagonally of the intermediate truss assembly. The flexible elements are held tautly when the truss unit is deployed, and slacken upon collapse of the unit. Therefore, in this modification, all the rigid members of the truss unit are neither bent, extended or contracted for the folding and unfolding of the unit, all that is required being to move one of the hinge assemblies along one of the intermediate truss members. Such truss members can be of rigid, high strength construction, making possible the construction of similarly rigid, high strength frameworks.

In the above stated form of the truss unit, the second movable hinge assembly is held adjacent the eleventh joint, when the truss unit is deployed, and is connected to the fourth and eighth joints respectively by connective diagonal truss members. In another form of the truss unit accoding to this invention, the second movable hinge assembly is held adjacent the twelfth joint instead of the eleventh joint and connected to the third and seventh joints instead of the fourth and eighth joints.

It should be appreciated that the two hinge assemblies are the only movable parts of the truss unit. As will be understood from the foregoing summary, the truss unit of this invention consists of two bays, one from the first end truss assembly to the intermediate truss assembly and the other from the intermediate truss assembly to the second end truss assembly. It can therefore be stated that the truss unit has only one movable part per bay. This simplicity of construction leads to reliability in use.

The above and other features and advantages of this invention and the manner of realizing them will become more apparent, and the invention itself will best be understood, from a study of the following description and appended claims, with reference had to the attached drawings showing some preferable embodiments of this invention.

DESCRIPTION OF THE PREFERRED EMBODIMENTS

First Form

This invention will now be described in detail in terms of the first form of the truss unit which is shown fully deployed in FIG. 1, half collapsed in FIG. 2, and fully collapsed in FIG. 3. The following description of construction will be best understood by referring to FIG. 1.

Figure 1:
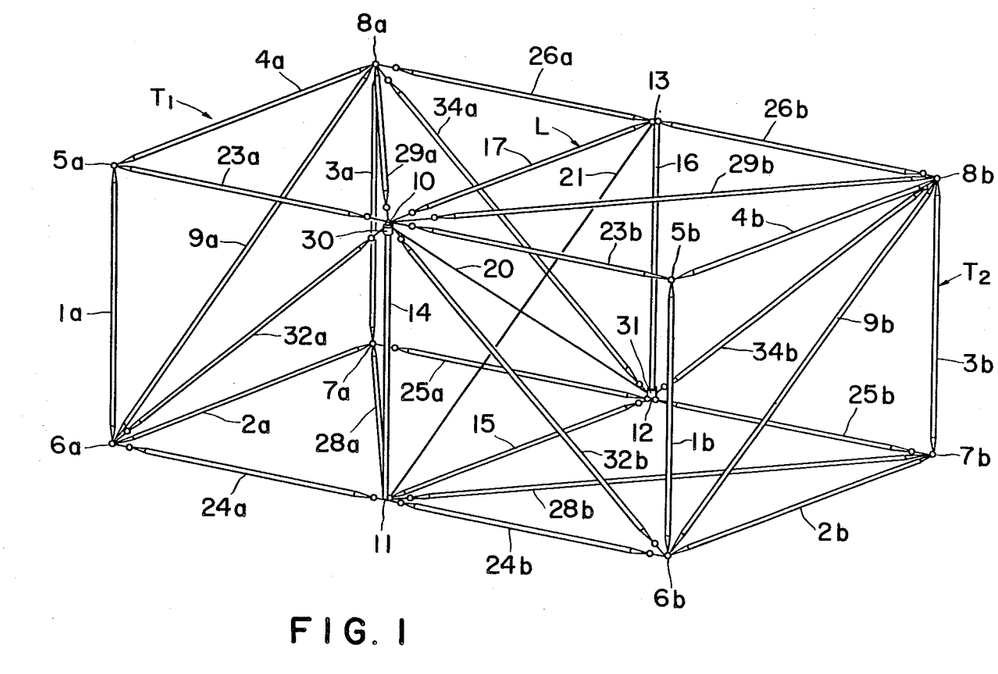
FIG. 1 shows in perspective a first form of collapsible truss unit constructed in accordance with the novel concepts of this invention, the truss unit being herein shown fully deployed.

The first form of the truss unit has a first end truss assembly T1 shown directed to the left in FIG. 1. The first and truss assembly T1 comprises four end truss members 1a, 2a, 3a and 4a joined end to end in rectangular or quadrilateral arrangement to provide first, second, third and fourth joints 5a, 6a, 7a and 8a. The first end truss assembly T1 further includes a diagonal end truss member 9a having its opposite ends coupled to the second joint 6a and fourth joint 8a. The diagonal end truss member 9a serves to brace the first end truss assembly T1 and to prevent its distortion.

At the other end of the truss unit, shown directed to the right in FIG. 1, is a second end truss assembly T2 of like configuration. The second end truss assembly T2 comprises four end truss members 1b, 2b, 3b and 4b joined endwise to one another in rectangular or quadrilateral arrangement to provide fifth, sixth, seventh and eighth joints 5b, 6b, 7b and 8b. The sixth joint 6b and eighth joint 8b are interconected by a diagonal end truss member 9b bracing the rectangular arrangement of the four end truss members 1b, 2b, 3b and 4b.

The two end truss assemblies T1 and T2 are disposed in parallel spaced relation to each other. Further the first, second, third and fourth joints 5a, 6a, 7a and 8a of the first end truss assembly T1 are opposed to the fifth, sixth, seventh and eighth joints 5b, 6b, 7b and 8b, respectively, of the second end truss assembly T2.

Disposed intermediate the opposite end truss assemblies T1 and T2 is an intermediate truss assembly L of the same shape and size as both end truss assemblies and in parallel spaced relation thereto. The intermediate truss assembly L comprises four intermediate truss members 14, 15, 16 and 17 pivotally joined endwise to one another to provide nineth, tenth, eleventh and twelfth joints 10, 11, 12 and 13. These nineth, tenth, eleventh and twelfth joints 10, 11, 12 and 13 lie between, and are aligned with, the first and fifth joints 5a and 5b, second and sixth joints 6a and 6b, third and seventh joints 7a and 7b, and fourth and eighth joints 8a and 8b, respectively, of the first and second end truss assemblies T1 and T2.

This particular embodiment employs two elongate, flexible elements 20 and 21 such as wires, cables, ropes, cords, etc., for bracing the intermediate truss assembly L when the truss unit is deployed as in FIG. 1. The one flexible element 21 has its opposite extremities secured to the tenth and twelfth joints 11 and 13, whereas the other flexible element 20 has its opposite extremities secured to two movable hinge assemblies 30 and 31, which will be referred to presently. The flexibility of these bracing elements 20 and 21 is intended to permit the collapsing of the truss unit, as will become apparent from the subsequent description of operation.

The above noted first and second end truss assemblies T1 and T2 and intermediate truss assembly L are interconnected by connective truss members listed below:

1. A first connective truss member 23a pivotally joined at both ends to the first joint 5a of the first end truss assembly T1 and to the nineth joint 10 of the intermediate truss assembly L.

2. A second connective truss member 24a pivotally joined at both ends to the second joint 6a of the first end truss assembly T1 and to the tenth joint 11 of the intermediate truss assembly L.

3. A third connective truss member 25a pivotally joined at both ends to the third joint 7a of the first end truss assembly T1 and to the eleventh joint 12 of the intermediate truss assembly L.

4. A fourth connective truss member 26a pivotally joined at both ends to the fourth joint 8a of the first end truss assembly T1 and to the twelfth joint 13 of the intermediate truss assembly L.

5. A fifth connective truss member 23b pivotally joined at both ends to the fifth joint 5b of the second end truss assembly T2 and ot the nineth joint 10 of the intermediate truss assembly L.

6. A sixth connective truss member 24b pivotally joined at both ends to the sixth joint 6b of the second end truss assembly T2 and to the tenth joint 11 of the intermediate truss assembly L.

7. A seventh connective truss member 25b pivotally joined at both ends to the seventh joint 7b of the second end truss assembly T2 and to the eleventh joint 12 of the intermediate truss assembly L.

8. An eighth connective truss member 26b pivotally joined at both ends to the eighth joint 8b of the second end truss assembly T2 and to the twelfth joint 13 of the intermediate truss assembly L.

Additionally, the first and second end truss assemblies T1 and T2 and intermediate truss assembly L are interconnected by the following four connective diagonal truss members:

1. A first connective diagonal truss member 28a pivotally joined at both ends to the third joint 7a of the first end truss assembly T1 and to the tenth joint 11 of the intermediate truss assembly L.

2. A second connective diagonal truss member 29a pivotally joined at both ends to the fourth joint 8a of the first end truss assembly T1 and to the nineth joint 10 of the intermediate truss assembly L.

3. A third connective diagonal truss member 28b pivotally joined at both ends to the seventh joint 7b of the second end truss assembly T2 and to the tenth joint 11 of the intermediate truss assembly L.

4. A fourth connective diagonal truss member 29b pivotally joined at both ends to the eighth joint 8b of the second end truss assembly T2 and to the nineth joint 10 of the intermediate truss assembly L.

The aforementioned two movable hinge assemblies 30 and 31 will now be described in more detail. The first movable hinge assembly 30 is slidably mounted on the intermediate truss member 14 for displacement in its longitudinal direction. When the truss unit is deployed as shown in FIG. 1, the first movable hinge assembly 30 lies adjacent, or against, the nineth joint 10 of the intermediate truss assembly L. The second movable hinge assembly 31 is likewise slidably mounted on the intermediate truss member 16, opposite the intermediate truss member 14, for displacement in its longitudinal direction. The second movable hinge assembly 31 lies adjacent, or against, the eleventh joint 12 of the intermediate truss assembly L when the truss unit is deployed as in FIG. 1.

These movable hinge assemblies 30 and 31 are coupled to the end truss assemblies T1 and T2 by the following two pairs of additional connective diagonal truss members:

1. A fifth connective diagonal truss member 32a pivotally joined at both ends to the first movable hinge assembly 30 and to the second joint 6a of the first end truss assembly T1.

2. A sixth connective diagonal truss member 32b pivotally joined at both ends to the first movable hinge assembly 30 and to the sixth joint 6b of the second end truss assembly T2.

3. A seventh connective diagonal truss member 34a pivotally joined at both ends to the second movable hinge assembly 31 and to the fourth joint 8a of the first end truss assembly T1.

4. An eighth connective diagonal truss member 34b pivotally joined at both ends to the second movable hinge assembly 31 and to the eighth joint 8b of the second end truss assembly T2.

Constructed as in the foregoing, the representative truss unit of this invention is generally boxlike in shape when deployed as in FIG. 1. It will also be seen that the truss unit is of bilaterally symmetrical construction with respect to the plane containing the intermediate truss assembly L.

Figure 4:
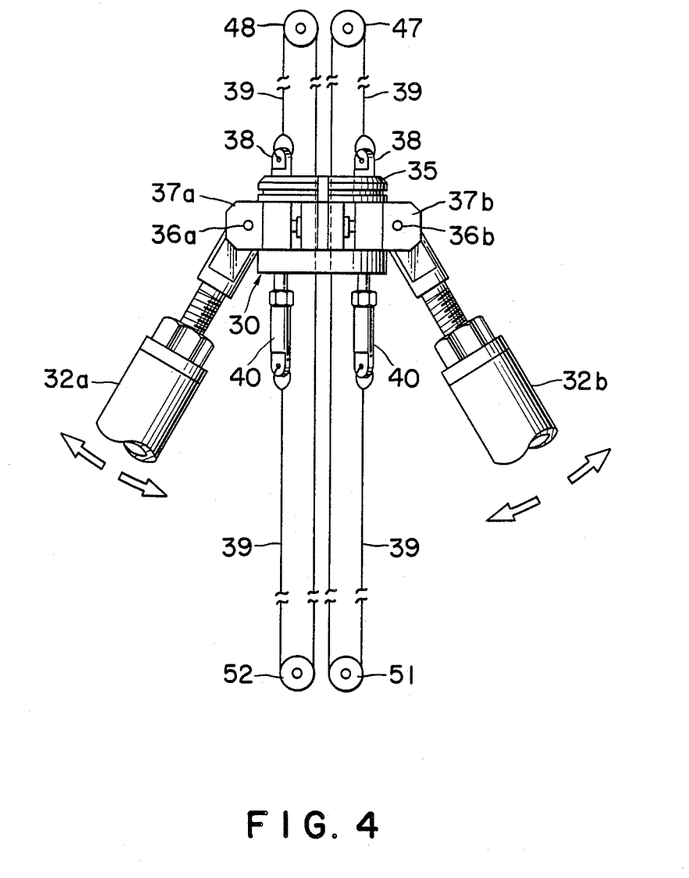
FIG. 4 is an enlarged elevation of the first movable hinge assembly of the truss unit of FIG. 1, shown together with part of the drive mechanism for the hinge assembly.

FIG. 4 illustrates a preferred form of the first movable hinge assembly 30 on the intermediate truss member 14. The first movable hinge assembly 30 has an annular body 35 slidably fitted over the intermediate truss member 14. The annular body 35 has two pairs of lugs 37a and 37b formed in diametrically opposite positions thereon and protruding radially outwardly therefrom. The noted fifth and sixth connective diagonal truss members 32a and 32b are pin jointed at 36a and 36b to these lug pairs 37a and 37b, respectively.

For reciprocably driving the first movable hinge assembly 30 along the intermediate truss member 14, a wire and pulley arrangement shown also in FIG. 4 is used. The wire and pulley arrangement includes two wires 39 each having one extremity anchored at 38 to one axial end of the annular body 35 of the first movable hinge assembly 30. The other extremity of each wire 39 is anchored at 40 to the other axial end of the annular body 35. Each wire 39 extends over two pulleys 47 and 51, or 48 and 52, on the opposite ends of the intermediate truss member 14.

Figure 5:
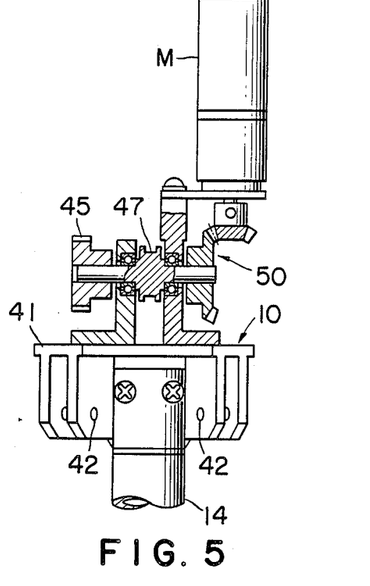
FIG. 5 is an elevation, partly shown sectioned for clarity, of part of the drive mechanism for the first movable hinge assembly.

As illustrated in FIG. 5, the intermediate truss member 14 has fixedly mounted on one end thereof a multiple hinge unit 41 constituting the nineth joint 10 of the intermediate truss assembly L. The multiple hinge unit 41 is formed to include pairs of lugs having holes 42 for receiving pivot pins, not shown, by which the intermediate truss member 17, connective truss members 23a and 23b and connective diagonal truss members 29a and 29b of FIG. 1 are coupled to the multiple hinge unit 41.

Figure 6:
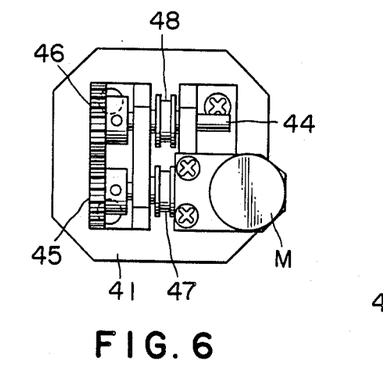
FIG. 6 is a top plan of the showing of FIG. 5.
Figure 7:
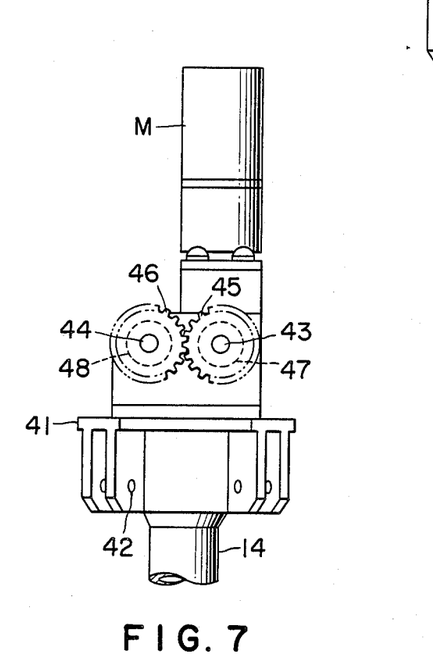
FIG. 7 is a left hand side elevation of the showing of FIG. 5.

With reference directed also to FIGS. 6 and 7, the multiple hinge unit 41 has rotatably mounted thereon a pair of shafts 43 and 44 extending parallel to each other in a transverse direction of the intermediate truss member 14. The shafts 43 and 44 nonrotatably carry a pair of intermeshing spur gears 45 and 46 each on one end thereof. The other end of the shaft 43 is coupled to a reversible drive motor M via bevel gearing 50. Nonrotatably mounted on the midpoints of the shafts 43 and 44 are the pulleys 47 and 48 set forth with reference to FIG. 4. Consequently, with the rotation of the drive motor M in either direction, the pulleys 47 and 48 will rotate in opposite directions with respect to each other.

Figure 8:
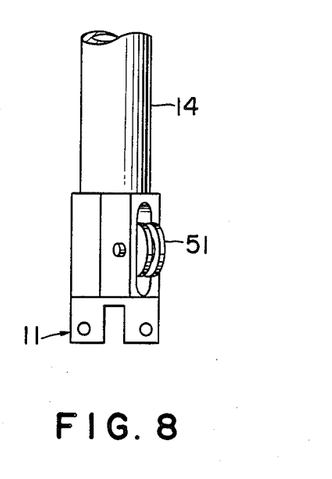
FIG. 8 is a fragmentary elevation of one of the intermediate truss members of the truss unit of FIG. 1, showing in particular one of the pulleys included in the drive mechanism for the first movable hinge assembly.

FIG. 8 indicates that the other two pulleys 51 and 52 are rotatably mounted on the other end of the intermediate truss member 14. Although this figure reveals only the pulley 51, it will be understood that the other pulley 52 is mounted in a like manner.

As will be seen by referring back to FIG. 4, the wires 39 extend from the anchors 40 on the first movable hinge assembly 30 down to the pulleys 51 and 52, then extend upwardly through the interior of the intermediate truss member 14, which is of tubular make as shown in FIGS. 5, 7 and 8, then are passed over the pulleys 47 and 48, and then are tied to the anchors 38 on the first movable hinge assembly 30. It is thus seen that the bidirectional rotation of the drive motor M results in the sliding movement of the first movable hinge assembly 30 up and down along the intermediate truss member 14.

Operation

As stated hereinbefore, the first movable hinge assembly 30 is held against the nineth joint 10, and the second movable hinge assembly 31 against the eleventh joint 12, when the truss unit is deployed as shown in FIG. 1. For collapsing this truss unit the drive motor M is set into rotation in the direction for driving the first movable hinge assembly 30 from the nineth joint 10 toward the tenth joint 11. Thereupon the truss unit will start collapsing as pictured in FIG. 2. An inspection of this figure will reveal that, during the progress of collapsing, the two opposite end truss assemblies T1 and T2 travel close to each other with their parallel relationship, as well as the rectangular shape of each, unchanged. However, the intermediate truss assembly L does change in shape, becoming elongated vertically as seen in FIG. 2. With such deformation of the intermediate truss assembly L, the connective truss members 25a, 25b, 26a and 26b pivot about the joints 12 and 13 in horizontal planes, whereas the other connective truss members 23a, 23b, 24a and 24b pivot about the joints 10 and 11 in a vertical plane.

Figure 3:
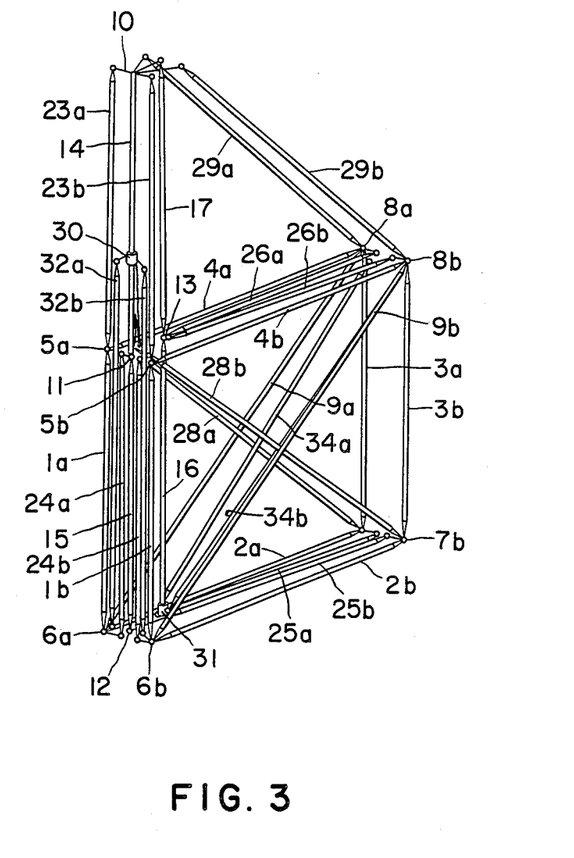
FIG. 3 shows in perspective the truss unit of FIG. 1 fully collapsed.

FIG. 3 shows the truss unit fully collapsed and flattened. The end truss assemblies T1 and T2 retain their rectangular shape but are held against each other. The intermediate truss assembly L has become straightened, with its truss members 14 and 17 in collinear relation to the other two intermediate truss members 15 and 16, respectively.

FIG. 3 further indicates that although the first movable hinge assembly 30 has been displaced from the nineth joint 10 toward the tenth joint 11, the second movable hinge assembly 31 still lies close to the eleventh joint 12. However, during the foregoing process of collapsing, the second movable hinge assembly 31 temporarily travels toward the twelfth joint 13 and then back toward the eleventh joint 12, returning to the initial position upon full collapse of the truss unit.

Figure 2:
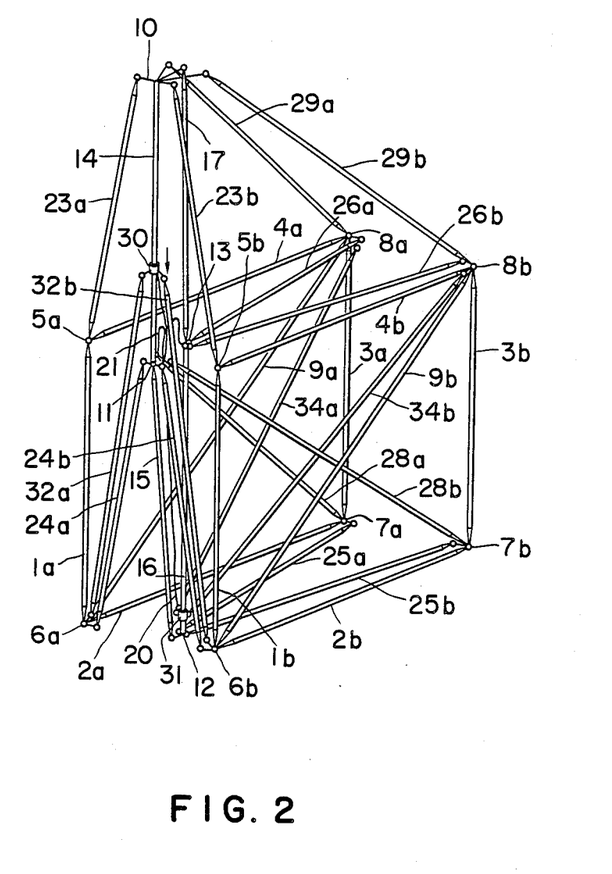
FIG. 2 shows in perspective the truss unit of FIG. 1 half collapsed.

The flexible elements 20 and 21 slacken, as shown in FIG. 2, when the intermediate truss assembly L becomes distored as explained previously. It is therefore essential that the distance between the movable hinge assemblies 30 and 31 interconnected by the flexible element 20, and the distance between the joints 11 and 13 interconnected by the flexible element 21, both become shorter when the truss unit is being collapsed than when it is fully deployed.

Figure 9:
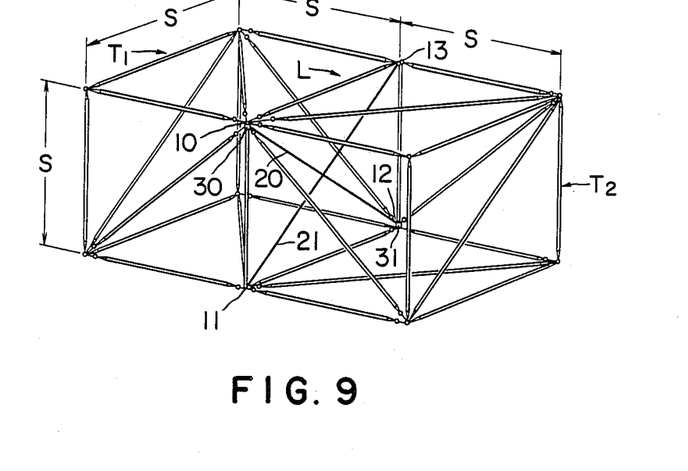
FIG. 9 is a view similar to FIG. 1 but showing some pertinent dimensions of the truss unit in order to explain its operation.
Figure 10:
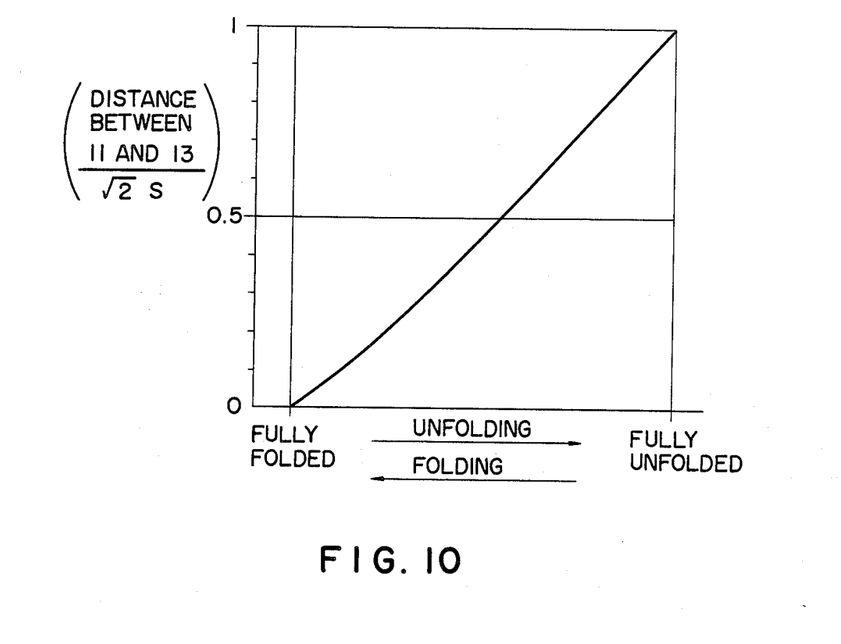
FIG. 10 is a graph plotting the change in the distance between two diagonally opposed joints of the intermediate truss assembly of the truss unit of FIG. 1 during the folding and unfolding thereof.
Figure 11:
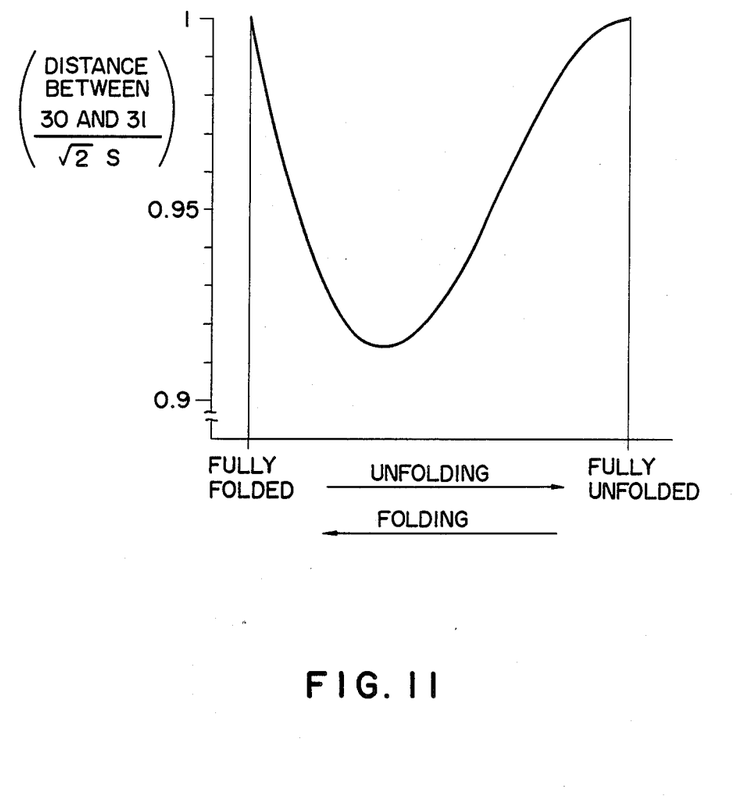
FIG. 11 is a graph plotting the change in the distance between the first and second hinge assemblies of the truss unit of FIG. 1 during the folding and unfolding thereof.

As indicated in FIG. 9, the end truss members 1a, 2a, 3a, 4a, 1b, 2b, 3b and 4b and connective truss members 23a, 24a, 25a, 26a, 23b, 24b, 25b and 26b are all of the same length S. Then the distance between the joints 11 and 13 of the intermediate truss assembly L changes linearly as in the graph of FIG. 10 during the folding or unfolding of the truss unit. The distance between the two movable hinge assemblies 30 and 31 changes nonlinearly as in the graph of FIG. 11 during the folding or unfolding of the truss unit. It will be observed from these graphs that the distances between the joints 11 and 13 and between the hinge assemblies 30 and 31 are both shorter when the truss unit is being collapsed than when it is fully deployed.

It is self evident, then, that the truss unit of FIG. 1 can be deployed from its folded state of FIG. 3 through the reversal of the above described procedure.

Modification

Figure 12:
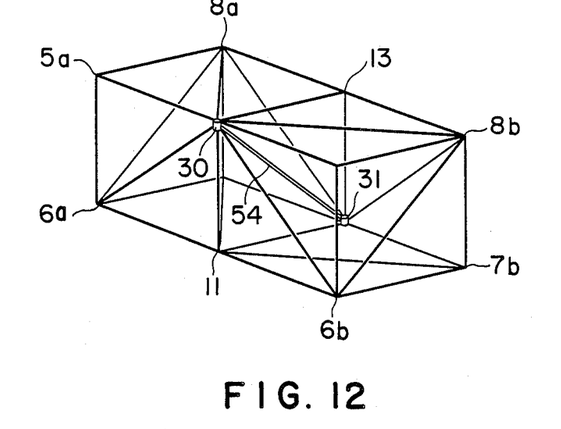
FIG. 12 is a diagrammatic representation of an alternative form of the collapsible truss unit in accordance with this invention.

A first modification of the first form of the truss unit shown in FIG. 12 employs an elongate, rigid brace member 54 for bracing the intermediate truss assembly L in place of the two flexible members of the foregoing embodiment. The rigid brace member 54 has its opposite ends operatively coupled to the two movable hinge assemblies 30 and 31. Although not clearly seen in FIG. 12, this brace member 54 comprises two or more sections that are telescopically nestable one with respect to another, so that the brace member is extensible or contractable as required during the folding or unfolding of the truss unit. Further, means, not shown, are provided whereby the brace member 54 is locked against contraction when the truss unit is deployed, for bracing the intermediate truss assembly L. The brace member may be unlocked for collapsing the truss unit.

This modified truss unit of FIG. 12 is identical in the other details of construction with the truss unit of FIGS. 1 through 9. Its operation will also be apparent from the operational description of the preceding embodiment.

Further Modification

Figure 13:
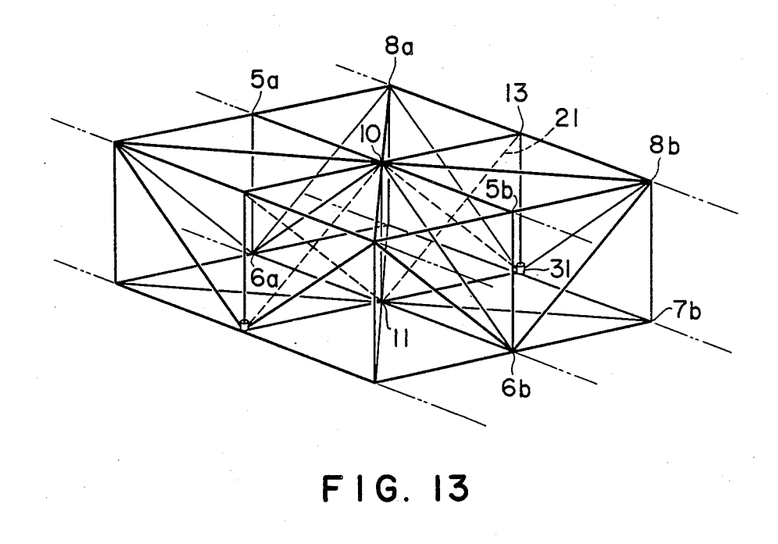
FIG. 13 is a diagrammatic representation of a further possible form which the collapsible truss unit of this invention may take in practice.

As has been mentioned, the truss unit of FIG. 1 or 12 is intended to be combined with a multiplicity of other similar units for the construction of any desired framework. However, as a possible modification of the foregoing truss units, the double size truss unit of FIG. 13 can be envisaged which may also be combined with like units for building a desired framework. This double size truss unit is, in essence, a combination of two truss units of the FIG. 1 or 12 construction in mirror image relation to each other with respect to the plane containing the joints 5a, 5b, 6a and 6b.

Second Form

A second form of the truss unit according to this invention will be described with reference to FIGS. 14 through 16.

Figure 14:
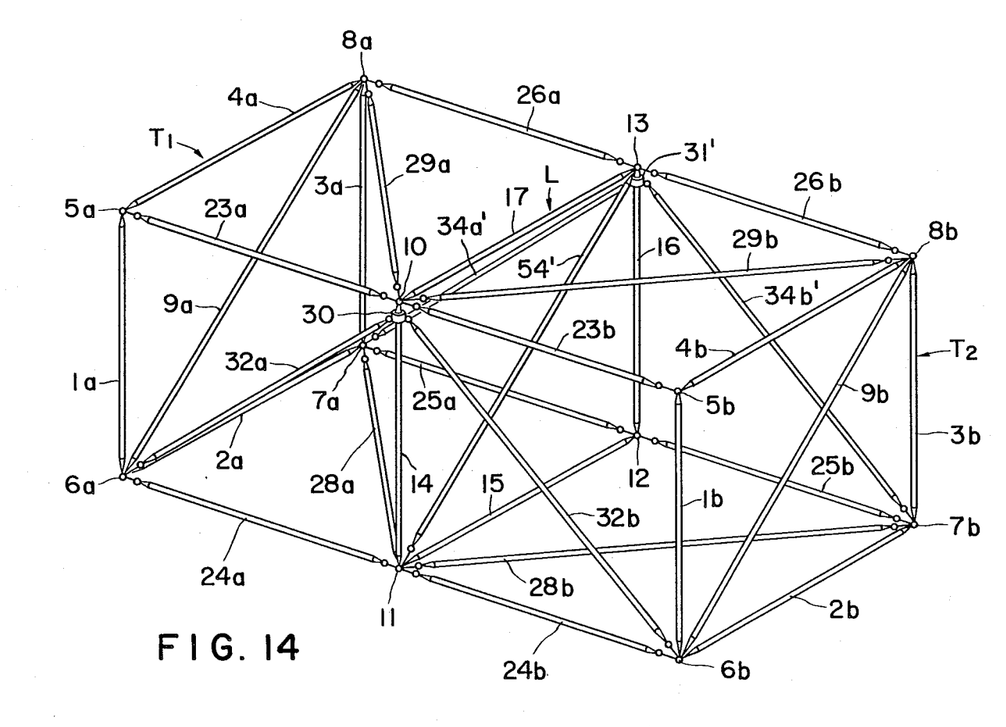
FIG. 14 shows in perspective a second form of collapsible truss unit constructed in accordance with the novel concepts of this invention, the truss unit being shown fully deployed.
Figure 15:
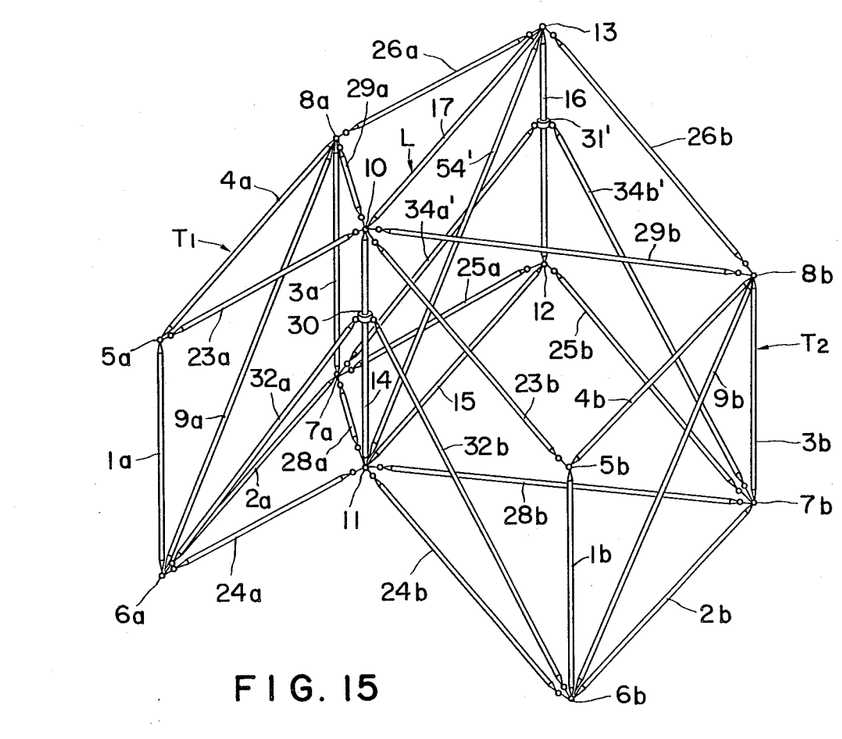
FIG. 15 shows in perspective the truss unit of FIG. 14 half collapsed.

FIG. 14 is a view similar to FIG. 1. As the basic construction of the truss unit shown in FIG. 14 is similar to the construction shown in FIG. 1, the only features thereof which are different from those of the unit of FIG. 1 will be explained.

In the truss unit of FIG. 1, the second movable hinge assembly 31 is held adjacent the eleventh joint 12 when the truss unit is deployed as shown, whereas in this second form of the truss unit the second movable hinge assembly 31' is held adjacent the twelfth joint 13 located at the opposite end of the intermediate truss member 16. The second movable hinge assembly 31' is mounted slidably on the intermediate truss member 16 and coupled to the end truss assemblies T1 and T2 by way of a seventh connective diagonal truss member 34a' and an eighth connective diagonal truss member 34b', respectively. The ends of these seventh and eighth connective diagonal truss members 34a' and 34b', remote from the second movable hinge assembly 31', are pivotally joined to the third and seventh joints 7a and 7b, respectively.

An elongate, rigid brace member 54' is provided for the intermediate truss assembly L. This brace member 54' is pivotally joied at both ends thereof to the tenth and twelfth joints 11 and 13 of the intermediate truss assembly L.

For collapsing this truss unit, a drive motor, such as the drive motor M shown in FIG. 5, is operated to drive the first or second movable hinge assembly 30 or 31' slidingly toward the tenth and eleventh joints 11 and 12. Thereupon the truss unit will start collapsing as illustrated in FIG. 15. An inspection of this figure will reveal that, during the process of collapsing, the two opposite end truss assemblies T1 and T2 travel toward each other with their parallel relationship, as well as their rectangular shape, maintained. It is to be noted that in this form of the truss unit the intermediate truss assembly L does not change in shape during the process of collapsing and only the connective truss members 23a, 23b, 24a, 24b, 25a, 25b, 26a and 26b pivot about the joints of the intermediate truss assembly L.

Figure 16:
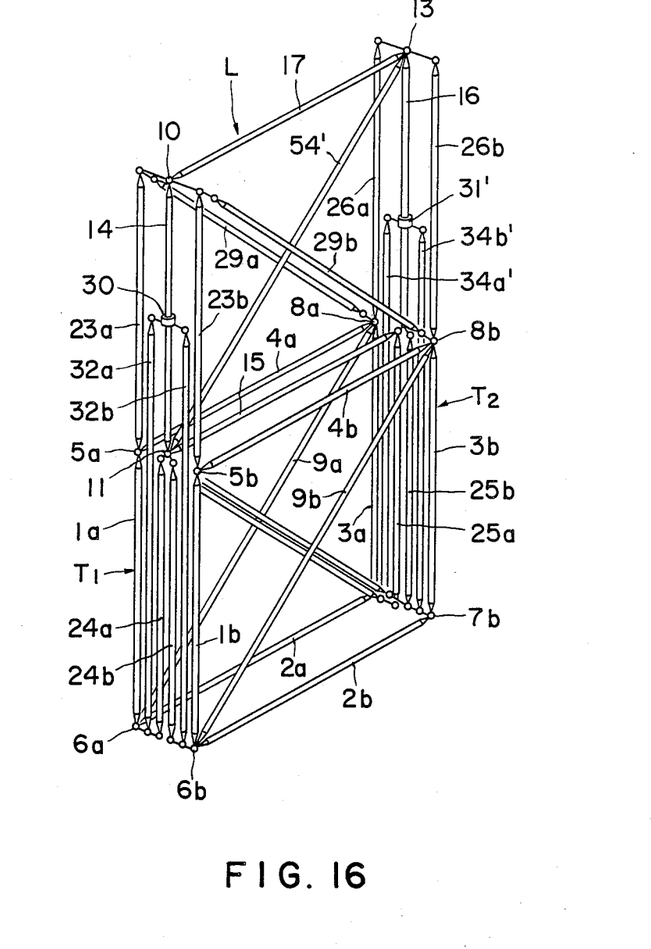
FIG. 16 shows in perspective the truss unit of FIG. 14 fully collapsed.

FIG. 16 shows the truss unit fully collapsed and flattened. It will be observed from this figure that the end truss assemblies T1 and T2 and the intermediate truss assembly L retain their rectangular shape and that the end truss assemblies T1 and T2 are held close to each other and the intermediate truss assembly L is shifted in a plane parallel to the planes of the two end truss assemblies out of the range of the same. It will also be observed that during and after the collapsing the two movable hinge assemblies 30 and 31' slide on the intermediate truss members 14 and 16, maintaining the same height as viewed in the drawings.

Although the invention has been shown and described in terms of several preferable embodiments thereof, this invention is not limited by the exact details of such embodiments. For example, the use of the wire and pulley arrangement in combination with the reversible drive motor is not essential for deploying and collapsing the truss unit of our invention, all that is required being that some forces be applied to the first movable hinge assembly for reciprocably driving the same along one of the intermediate truss members. Additional modifications or alterations of the illustrated embodiments may be resorted to without departing from the scope of the invention.

What is claimed is:

1. A collapsible truss unit for use in combination with other like units for the construction of, for example, a permanent or semipermanent framework in outer space or a temporary framework on the earth, the collapsible truss unit comprising:
   (a) a first end truss assembly comprising four end truss members joined to one another in quadrilateral arrangement to provide first, second, third and fourth joints, and a diagonal end truss member joined at both ends to two diagonally opposite ones of the first, second, third and fourth joints;
   (b) a second end truss assembly comprising four end truss members joined to one another in quadrilateral arrangement to provide fifth, sixth, seventh and eighth joints, and a diagonal end truss member joined at both ends to two diagonally opposite ones of the fifth, sixth, seventh and eighth joints;
   (c) the first and second end truss assemblies being disposed in parallel spaced relation to each other and with the first, second, third and fourth joints of the first end truss assembly opposed to the fifth, sixth, seventh and eighth joints, respectively, of the second end truss assembly;
   (d) an intermediate truss assembly comprising four intermediate truss members pivotally joined to one another in quadrilateral arrangement to provide nineth, tenth, eleventh and twelfth joints, the nineth, tenth, eleventh and twelfth joints of the intermediate truss assembly being disposed intermediate the first and fifth joints, second and sixth joints, third and seventh joints, and fourth and eighth joints, respectively, of the first and second end truss assemblies;

(e) a first connective truss member pivotally joined at both ends to the first joint of the first end truss assembly and to the nineth joint of the intermediate truss assembly;

(f) a second connective truss member pivotally jointed at both ends to the second joint of the first end truss assembly and to the tenth joint of the intermediate truss assembly;

(g) a third connective truss member pivotally joined at both ends to the third joint of the first end truss assembly and to the eleventh joint of the intermediate truss assembly;

(h) a fourth connective truss member pivotally joined at both ends to the fourth joint of the first end truss assembly and to the twelfth joint of the intermediate truss assembly;

(i) a fifth connective truss member pivotally joined at both ends to the fifth joint of the second end truss assembly and to the nineth joint of the intermediate truss assembly;

(j) a sixth connective truss member pivotally joined at both ends to the sixth joint of the second end truss assembly and to the tenth joint of the intermediate truss assembly;

(k) a seventh connective truss member pivotally joined at both ends to the seventh joint of the second end truss assembly and to the eleventh joint of the intermediate truss assembly;

(l) an eighth connective truss member pivotally joined at both ends to the eighth joint of the second end truss assembly and to the twelfth joint of the intermediate truss assembly;

(m) a first connective diagonal truss member pivotally joined at both ends to the third joint of the first end truss assembly and to the tenth joint of the intermediate truss assembly;

(n) a second connective diagonal truss member pivotally joined at both ends to the fourth joint of the first end truss assembly and to the nineth joint of the intermediate truss assembly;

(o) a third connective diagonal truss member pivotally joined at both ends to the seventh joint of the second end truss assembly and to the tenth joint of the intermediate truss assembly;

(p) a fourth connective diagonal truss member pivotally joined at both ends to the eighth joint of the second end truss assembly and to the nineth joint of the intermediate truss assembly;

(q) a first movable hinge assembly mounted on that one of the intermediate truss members which extends between the nineth and tenth joints, for movement in the longitudinal direction thereof, the first movable hinge assembly being held adjacent the nineth joint when the truss unit is deployed, and being displaced toward the tenth joint when the truss unit is collapsed;

(r) a fifth connective diagonal truss member pivotally joined at both ends to the first movable hinge assembly and to the second joint of the first end truss assembly;

(s) a sixth connective diagonal truss member pivotally joined at both ends to the first movable hinge assembly and to the sixth joint of the second end truss assembly;

(t) a second movable hinge assembly mounted on that one of the intermediate truss members which extends between the eleventh and twelfth joints, for movement in the longitudinal direction thereof, the second movable hinge assembly being held adjacent the eleventh joint when the truss unit is deployed, and being displaced toward, and then away from, the twelfth joint when the truss unit is being collapsed;

(u) a seventh connective diagonal truss member pivotally joined at both ends to the second movable hinge assembly and to the fourth joint of the first end truss assembly;

(v) an eighth connective diagonal truss member pivotally joied at both ends to the second movable hinge assembly and to the eighth joint of the second end truss assembly; and (w) brace means mounted to the intermediate truss assembly for maintaining the same in the required quadrilateral shape when the truss unit is deployed.

2. The collapsible truss unit of claim 1 wherein the brace means comprises:
   (a) a first elongate, flexible brace member extending between the first and second movable hinge assemblies; and
   (b) a second elongate, flexible brace member extending between the tenth and twelfth joints of the intermediate truss assembly;
   (c) both first and second brace members being held tautly when the truss unit is deployed, and slackening when the truss unit is collapsed.

3. The collapsible truss unit of claim 1 wherein the brace means comprises an elongate, extensible, rigid brace member extending between the first and second movable hinge assemblies, the brace member being held fully extended when the truss unit is deployed, and being contracted when the truss unit is collapsed.

4. The collapsible truss unit of claim 1 further comprising drive means for reciprocably moving the first movable hinge assembly along said one of the intermediate truss members in order to collapse and deploy the truss unit.

5. The collapsible truss unit of claim 4 wherein the drive means comprises:
   (a) pulley means rotatably mounted on the opposite ends of said one intermediate truss member;
   (b) elongate flexible means extending over the pulley means and anchored at both ends to the first movable hinge assembly; and
   (c) a reversible drive motor for imparting bidirectional rotation to the pulley means.

6. A collapsible truss unit for use in combination with other like units for the construction of, for example, a permanent or semipermanent framework in outer space or a temporary framework on the earth, the collapsible truss unit comprising:
   (a) a first end truss assembly comprising four end truss members joined to one another in quadrilateral arrangement to provide first, second, third and fourth joints, and a diagonal end truss member joined at both ends to two diagonally opposite ones of the first, second, third and fourth joints;
   (b) a second end truss assembly comprising four end truss members joined to one another in quadrilateral arrangement to provide fifth, sixth, seventh and eighth joints, and a diagonal end truss member joined at both ends to two diagonally opposite ones of the fifth, sixth, seventh and eighth joints;

(c) the first and second end truss assemblies being disposed in parallel spaced relation to each other and with the first, second, third and fourth joints of the first end truss assembly opposed to the fifth, sixth, seventh and eighth joints, respectively, of the second end truss assembly;

(d) an intermediate truss assembly comprising four intermediate truss members pivotally joined to one another in quadrilateral arrangement to provide nineth, tenth, eleventh and twelfth joints, the nineth, tenth, eleventh and twelfth joints of the intermediate truss assembly being disposed intermediate the first and fifth joints, second and sixth joints, third and seventh joints, and fourth and eighth joints, respectively, of the first and second end truss assemblies;

(e) a first connective truss member pivotally joined at both ends to the first joint of the first end truss assembly and to the nineth joint of the intermediate truss assembly;

(f) a second connective truss member pivotally joined at both ends to the second joint of the first end truss assembly and to the tenth joint of the intermediate truss assembly;

(g) a third connective truss member pivotally joined at both ends to the third joint of the first end truss assembly and to the eleventh joint of the intermediate truss assembly;

(h) a fourth connective truss member pivotally joined at both ends to the fourth joint of the first end truss assembly and to the twelfth joint of the intermediate truss assembly;

(i) a fifth connective truss member pivotally joined at both ends to the fifth joint of the second end truss assembly and to the nineth joint of the intermediate truss assembly;

(j) a sixth connective truss member pivotally joined at both ends to the sixth joint of the second end truss assembly and to the tenth joint of the intermediate truss assembly;

(k) a seventh connective truss member pivotally joined at both ends to the seventh joint of the second end truss assembly and to the eleventh joint of the intermediate truss assembly;

(l) an eighth connective truss member pivotally joined at both ends to the eighth joint of the second end truss assembly and to the twelfth joint of the intermediate truss assembly;

(m) a first connective diagonal truss member pivotally joined at both ends to the third joint of the first end truss assembly and to the tenth joint of the intermediate truss assembly;

(n) a second connective diagonal truss member pivotally joined at both ends to the fourth joint of the first end truss assembly and to the nineth joint of the intermediate truss assembly;

(o) a third connective diagonal truss member pivotally joined at both ends to the seventh joint of the second end truss assembly and to the tenth joint of the intermediate truss assembly;

(p) a fourth connective diagonal truss member pivotally joined at both ends to the eighth joint of the second end truss assembly and to the nineth joint of the intermediate truss assembly;

(q) a first movable hinge assembly mounted on that one of the intermediate truss members which extends between the nineth and tenth joints, for movement in the longitudinal direction thereof, the first movable hinge assembly being held adjacent the nineth joint when the truss unit is deployed, and being displaced toward the tenth joint when the truss unit is collapsed;

(r) a fifth connective diagonal truss member pivotally joined at both ends to the first movable hinge assembly and to the second joint of the first end truss assembly;

(s) a sixth connective diagonal truss member pivotally joined at both ends to the first movable hinge assembly and to the sixth joint of the second end truss assembly;

(t) a second movable hinge assembly mounted on that one of the intermediate truss members which extends between the eleventh and twelfth joints, for movement in the longitudinal direction thereof, the second movable hinge assembly being held adjacent the twelfth joint when the truss unit is deployed, and being displaced toward the eleventh joint when the truss unit is being collapsed;

(u) a seventh connective diagonal truss member pivotally joined at both ends to the second movable hinge assembly and to the third joint of the first end truss assembly;

(v) an eighth connective diagonal truss member pivotally joined at both ends to the second movable hinge assembly and to the seventh joint of the second end truss assembly; and (w) brace means provided to the intermediate truss assembly for maintaining the same in the required quadrilateral shape.

7. The collapsible truss unit of claim 1 wherein the brace means comprises an elongate rigid brace member extending diagonally opposite joints of the intermediate truss assembly.

* * * * *